United States Patent [19]

Edelson

[11] Patent Number: 5,675,972
[45] Date of Patent: Oct. 14, 1997

[54] METHOD AND APPARATUS FOR VACUUM DIODE-BASED DEVICES WITH ELECTRIDE-COATED ELECTRODES

[75] Inventor: Jonathan Sidney Edelson, Princeton, N.J.

[73] Assignee: Borealis Technical Limited, London, England

[21] Appl. No.: 719,792

[22] Filed: Sep. 25, 1996

[51] Int. Cl.⁶ .................................. F25B 21/00; H01J 1/05
[52] U.S. Cl. .................................. 62/3.1; 313/310; 313/311
[58] Field of Search ........................... 62/3.1, 259.2, 62/324.2; 313/310, 311, 309

[56] References Cited

U.S. PATENT DOCUMENTS 5,356,484  10/1994  Yater et al. ..................... 136/200
5,569,973  10/1996  Zimmerman ..................... 313/309
5,598,052   1/1997  Khan et al. ..................... 313/310

*Primary Examiner*—William Doerrler

[57] ABSTRACT

Vacuum diode-based devices, including Vacuum Diode Heat Pumps and Vacuum Thermionic Generators, are described in which the electrodes are coated with an electride. These materials have low work functions, which means that contact potential difference between cathode and anode may be set against the effects of space charge, resulting in an improved device whereby anode and cathode may be set at a greater distance from each other than has been previously envisaged.

17 Claims, 2 Drawing Sheets

I

II

III

METHOD AND APPARATUS FOR VACUUM DIODE-BASED DEVICES WITH ELECTRIDE-COATED ELECTRODES

FIELD OF THE INVENTION

The present invention is related to vacuum diode-based thermoelectric devices, and in particular to vacuum diode-based thermoelectric devices with electrodes having a low work function.

BACKGROUND OF THE INVENTION

VACUUM DIODE-BASED DEVICES

In Edelson's disclosure, filed 1995 Mar. 7, titled "Electrostatic Heat Pump Device and Method", Ser. No. 08/401,038, two porous electrodes were separated by a porous insulating material to form an electrostatic heat pump. In said device, evaporation and ionization of a working fluid in an electric field provided the heat pumping capacity. The use of electrons as the working fluid is disclosed in that application. In Edelson's subsequent disclosure, filed 1995 Jul. 5, titled "Method and Apparatus for Vacuum Diode Heat Pump", Ser. No. 08/498,199, an improved device and method for the use of electrons as the working fluid in a heat pumping device is disclosed. In this invention, a vacuum diode is constructed using a low work function cathode.

In Edelson's further subsequent disclosure, filed 1995 Dec. 15, titled "Method and Apparatus for Improved Vacuum Diode Heat Pump", Ser. No. 08/573,074, the work function of the anode was specified as being lower than the work function of the cathode in order to optimize efficient operation.

In a yet further subsequent disclosure, filed 1995 Dec. 27, titled "Method and Apparatus for a Vacuum Diode Heat Pump With Thin Film Ablated Diamond Field Emission", Ser. No. 08/580,282, Cox and Edelson disclose an improvement to the Vacuum Diode Heat Pump, wherein a particular material and means of construction was disclosed to further improve upon previous methods and devices.

The Vacuum Diode at the heart of Edelson's Vacuum Diode Heat Pump may also be used as a thermionic generator: the differences between the two devices being that in the operation of the thermionic generator, the cathode is warmer than the anode, and heat flows from a warmer region to a cooler region. The thermionic generator is well known in the art.

In Cox's disclosure, filed 1996 Mar. 6, titled "Method and Apparatus for a Vacuum Thermionic Converter with Thin Film Carbonaceous Field Emission", Ser. No. 08/610,599, a Vacuum Diode is constructed in which the electrodes of the Vacuum Diode are coated with a thin film of diamond-like carbonaceous material. A Vacuum Thermionic Converter is optimized for the most efficient generation of electricity by utilizing a cathode and anode of very low work function. The relationship of the work functions of cathode and anode are shown to be optimized when the cathode work function is the minimum value required to maintain current density saturation at the desired temperature, while the anode's work function is as low as possible, and in any case lower than the cathode's work function. When this relationship is obtained, the efficiency of the original device is improved.

Electrides and Alkalides

Low work function electrode technology, particularly cold cathode technology, is presently undergoing extensive development, with many articles being published and numerous patents being issued. Work in the art has been focused on the development of better emissive structures and materials, the use of such devices in electronic applications, and enhanced methods of fabricating such devices as well as fabricating integrated devices. In order to facilitate the flow of electrons from cathode to anode, surfaces of very low work functions must be constructed, and some alkalides and electrides have this property.

These compounds have developed out of the study of solvated electrons. Solvated electrons have been the subject of investigations spanning 80 years. They were first proposed as the reducing species of the alkali metals dissolved in ammonia, amines, and polyethers and were also known to be produced from the photolysis or radiolysis of liquids. Alkali metal anions were proposed in the 1960's to be diamagnetic species found in metal-ammonia and metal-amine solutions. Alkalides are crystalline salts containing an alkali metal anion and a complexed or cryptated alkali metal cation. Many alkalides of sodium, potassium, rubidium and cesium are now known, and a number of crystal structures have also been resolved.

Electrides are ionic compounds containing the simplest possible anion—the electron. Pioneering work by J. L. Dye (Michigan State University) led to an entirely new class of salts where stoichiometric amounts of electrons serve as the anions to complexed or cryptated alkali cations. In his article of February 1990 in Science, titled "Electrides: Ionic Salts with Electrons as the Anions", James Dye reviews the chemistry of electrides and describes the electrical, crystallographic and spectrographic properties of two electrides.

As indicated above, alkali metals dissolve as free ions in only a small number of solvents. This is because they are powerful reducing agents and tend to react directly with most solvents ionic solvents, while not dissolving in most stable organic solvents. But the range of solvents able to dissolve the metals is increased in the presence of a complexing agent such as a crown ether or cryptand, because of the following equilibria:

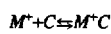

in which C is the complexing agent, are shifted. These equilibria, together with the following equilibrium:

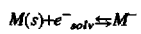

enable the preparation of concentrated solution of $M^+C$ in a solvent such as dimethyl ether in which the counterion is either $M^-$ or $e^-_{solv}$, depending on the stoichiometric ratio of complexing agent to metal. Where the counterion is $M^-$, a crystalline alkalide may be obtained, in which the crystal lattice structure contains complexed metal cations and free metal anions. Where the counterion is $e^-_{solv}$, a crystalline electride can be prepared: here the crystal lattice structure contains complexed metal cations and solvated electrons. The complexing agent used must be resistant to reduction by the solvated electron or alkali metal anion and must be a strong enough complexant to compete with the polar solvent for the alkali metal cation. Crown ethers and cryptands meet these requirements, and where used to prepare the first alkalides and electrides. Subsequently aza-crowns, such as hexemethyl hexacyclen and polyaza bicyclic complexants similar to cryptands have been used.

The defining aspect of the complexing agents is multiple atoms each with one or more lone pairs of electrons, said atoms held in a structure which envelops the complexed cation. This may be seen from the drawings, in which Nitrogen atoms or Oxygen atoms provide the electrons pairs for complexing, and the carbon provides a skeleton to form fixed rings.

One feature of some these ionic compounds is that they show thermionic emission at temperatures as low as −80° C. In his 1987 article in Scientific American, Volume 257, pages 66–75 Dye suggests that because the electrons are so weakly bound in electrides, they could be used as photosensitive detectors in infra-red sensing photomultipliers, solar energy converters and as cathodes in batteries, but he does not teach that this property may be used in thermionic or heat pumping applications. Although the rapid decomposition of many electrides which occurs at temperatures above 0° C., together with their reactivity towards oxygen and moisture, are major barriers to their use in electronic devices, initial work with poly-aza bicyclic complexants similar to the cryptands suggests that it might be possible to synthesize electrides that are stable both to decomposition and decomplexation: for example an alkalide formed from hexamethyl hexacyclen-complexed potassium cations and sodium anions is stable at temperatures up to 40° C.

In his June 1988 article in the Abstracts of Papers of the American Chemical Society, Volume 195, page 207, entitled "Thin-Film Fabrication of Cesium Alkalides and Electrides", Dye and coworkers demonstrate that the electrides may be formed into a thin film.

In Huang's 1990 article in Chemical Physics Letters, volume 166, number 2, pages 133–136, titled 'Low Temperature (−80° C.) Thermionic Electron Emission from Alkalides and Electrides', Huang and Dye report low temperature thermionic emission from the electrides $K^+(15\text{-CROWN-5})_2e^-$ and $Rb^+(15\text{-CROWN-5})_2e^-$ and the alkalides $K^+(15\text{-CROWN-5})_2K^-$ and $Rb^+(15\text{-CROWN-5})_2Rb^-$. Decomposition of these materials was also reported over the course of the emission experiments.

In his 1996 article in the Journal of Physical Chemistry, volume 100, Number 9, pages 3395–3401 titled "Optical-Absorption and Reflection Spectra of $Na^+Crypt[2.2.2]Na^-$", Dye and coworkers describe polycrystalline thin films prepared by codeposition of sodium and cryptand[2.2.2]

In their 1995 paper in Journal of the American Chemical Society, pages 9087 to 9088, Edwards' group at Birmingham University, England, report an entirely new class of crystalline electrides synthesised from zeolites.

In their article of May 1st, 1994, in Analytical Chemistry volume 66 page 1572, J. B. Heyns et.al. modified crown ethers with thiol functionalities and anchored them to silver surfaces.

BRIEF DESCRIPTION OF THE INVENTION

The Vacuum Diode-based devices previously disclosed require electrodes of low work function for efficient operation. Moreover, they require electrodes having different work functions so that contact potential difference between cathode and anode may be set against the effects of space charge, resulting in an improved device whereby anode and cathode may be set at a greater distance from each other than has been previously envisaged, thereby simplifying construction.

The present invention provides electrodes either made from or coated with an electride or alkalide material. Some of these have a very low work function, leading to the copious emission of electrons at ambient temperatures. Table 1 gives several examples of electrides.

The two chief drawbacks to the use of electrides described above by Dye, namely their reactivity towards oxygen and moisture, are overcome in the construction of Vacuum Diode-based devices: these contain two electrodes separated by vacuum, so an electride coating on one or both of these electrodes would not be exposed to either atmospheric oxygen or moisture.

In one embodiment the anode of the Vacuum Diode-Based device is constructed from a conductive material coated with a very low work function electride or alkalide. The cathode is similarly constructed but coated with a material having a higher work function: this may be another electride, an alkalide, or a different material. Thermal energy of the electrons in the cathode causes thermionic emission. In the case that the cathode is warmer than the anode, a bulk current of electrons will tend to flow from cathode to anode, through the external circuit, and back to the cathode. In this case, the device is a Vacuum Thermionic Converter, as well known in the art, and improved by the materials specified herein.

In the case that the cathode is cooler than the anode, an externally applied potential may be used to cause current to flow from cathode through the vacuum to the anode. In this latter case, the device will operate as a heat pump, absorbing heat at a low temperature, and releasing it at a higher temperature, as previously disclosed by Edelson and improved through the use of the presently specified materials.

OBJECTS AND ADVANTAGES

An object of the present invention is to provide improved materials for the electrodes of a Vacuum Diode Heat Pump or Vacuum Thermionic Converter having very low work functions.

An advantage of the present invention is that it employs electrodes made from or coated with an electride or alkalide material giving copious electron emission at low temperatures.

An object of the present invention is to provide a Vacuum Diode Heat Pump with improved efficiency.

An object of the present invention is to provide a Vacuum Diode Thermionic Converter with improved efficiency.

An object of the present invention to eliminate the need for costly and difficult fabrication techniques related to the spacing between anode and cathode of a Vacuum Diode Heat Pump or Vacuum Thermionic Converter.

An advantage of the present invention is that the availability of very low work function materials allows the contact potential difference between the electrodes of the Vacuum Diode-based Device to offset space charge effects, thereby allowing a greater distance between the cathode and anode of a Vacuum Diode Heat Pump or Vacuum Thermionic Converter than was previously regarded as practical.

Still further objects and advantages will become apparent from the ensuing description.

Reference Numerals in the Drawings

1 Cathode
2 Anode
11 Cathode coating

12 Anode coating
21 Vacuum
22 Outer casing of the Vacuum Diode
31 External circuit

DETAILED DESCRIPTION OF THE INVENTION

Figure 1:
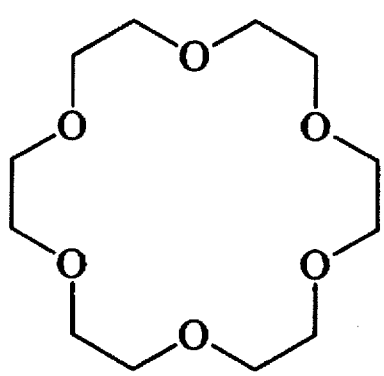
FIG. 1 shows the structure of 18-CROWN-6 (I), cryptand [2.2.2](II) and hexamethyl hexacyclen (III)
Figure 1:
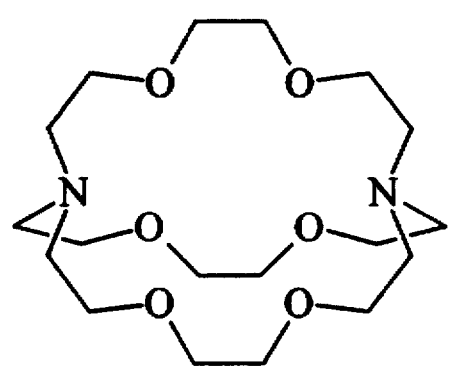
Figure 1:
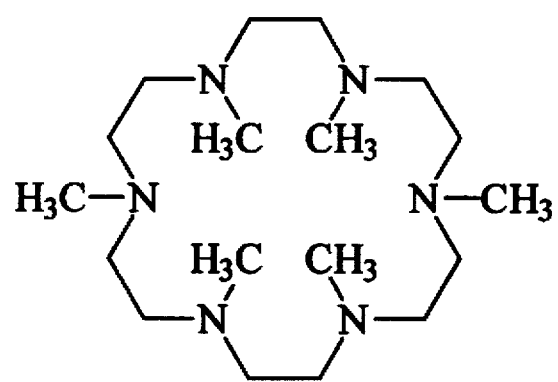
Figure 2:
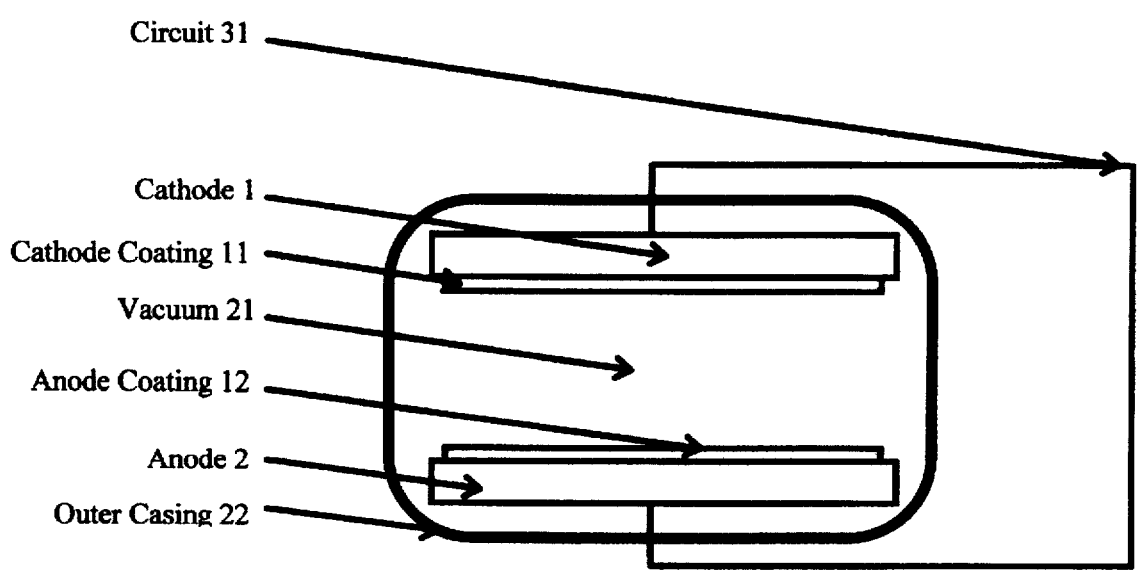
FIG. 2 shows a schematic representation of a Vacuum Diode-Based Device

The invention provides improved materials for the electrodes of a Vacuum Diode Heat Pump or Vacuum Thermionic Converter having very low work functions. The Vacuum Diode (see FIG. 2) is comprised of a cathode (1) separated from an anode (2) by a vacuum (21) and encased in an outer casing (22). Either or both the cathode (1) and the anode (2) are coated (11, 12) with these improved materials, and are connected by an external circuit (21). The circuit (21) contains either a power source or a load, depending on whether the vacuum diode is being operated as a Vacuum Diode Heat Pump or a Vacuum Thermionic Generator, respectively.

In one embodiment, the anode (2) is coated with an electride or alkalide material with a low work function (22) and the cathode (1) is coated with another electride, alkalide or a different material, with a higher work function (21).

In another embodiment the electrode is coated with the electride material by vapor deposition. This process, which yields thin electride films of controllable thickness and composition, involves placing the complexant and alkali metal in separate containers under high vacuum. By manipulating the temperature of the containers, the metal and complexant are evaporated and deposited simultaneously onto the electrode surface at an adjustable rate. A solid state reaction between the complexant and metal produces the electride film. In a further embodiment, the electrides or alkalides could be layered onto diamond or sapphire by vapor deposition in a similar manner.

In a further embodiment, the electrode is bonded to dehydrated zeolite and exposed to potassium vapor, which results in stoichiometric amounts of potassium cations and electrons being incorporated, or "dissolved" into the solid zeolite host. Said zeolite material is than coated upon the electrode surfaces, or coated upon the electrode surfaces prior to exposure to the alkaline metal vapor.

In another embodiment, a metal electrode, preferably a silver electrode, is treated with a modified crown ether having thiol functionalities which allow it to be immobilized to the silver surface. Gas phase or solution techniques may then be used to complex alkali cations into the immobilized crown ethers, forming electride like materials.

With Reference to figure one, several examples of known complexing agents are shown. These are meant to exemplify, not limit, the types of complexing agents which may be used.

A preferred embodiment has electrodes coated with a film of the electride $K^+(15\text{-CROWN-}5)_2 e^-$. A cathode is coated with a solution of the electride in methylamine, and exposed to high vacuum, whereupon the solvent evaporates yielding a film of the electride on the surface of said electrode.

SUMMARY, RAMIFICATIONS, AND SCOPE

It may be seen from the above description that these improved electrode materials provide for the construction of electrodes for vacuum diode-based devices which have a very low work function.

In the preferred embodiment described above, the electrode is coated with $K^+(15\text{-CROWN-}5)_2 e^-$ and used to construct a vacuum diode based device with improved efficiency.

In a further group of possible embodiments, different electride materials may be used. These may have different alkali metal substituents and the complexing agent may be other than cryptand [2.2.2], such as 18-CROWN-6, 15-CROWN-5, or hexamethyl hexacyclen. Complexing agents may in general be described as cyclic or polycylcic (being rings or joined rings), heterocyclic (having atoms other than carbon forming the rings), multidentate ligands (compounds capable of forming multiple bonds to a metal ion).

Although the description above contains many specificities, these should not be construed as limiting the scope of the invention but as merely providing illustrations of some of the presently preferred embodiments of this invention. For example, electride materials having a different alkali metal substituent may be used. The complexing agent used may also be varied. Thus the scope of the invention should be determined by the appended claims and their legal equivalents, rather than by the examples given.

I claim:

1. A method and apparatus for pumping heat comprising
   a) a vacuum diode, a cathode of said vacuum diode being in thermal contact with a mass from which said heat is to be removed, an anode of said vacuum diode being in thermal contact with a mass to which said heat is to be carried, said cathode of said vacuum diode having a work function consistent with copious electron emission at the temperature of said mass from which heat is to be removed, said cathode being separated from said anode by a vacuum, and,
   b) a supply of electrical power capable of supplying current at suitable voltage to said vacuum diode, the improvement wherein being that a compound composed of complexed alkali metal cations forms part of an electrode selected from the group consisting of said anode and said cathode.

2. The method and apparatus of claim 1 in which said cathode is cooler than said anode.

3. The method and apparatus of claim 1 in which said compound is selected from the group consisting of alkalides and electrides.

4. The method and apparatus of claim 1 in which said compound has a lattice structure comprising alkali metal cations complexed by a complexing agent selected from the group consisting of crown ethers, aza-crowns, cryptands, aza-cryptands, poly-aza bicyclic complexants and zeolites, and a counterion.

5. The method and apparatus of claim 4 in which said counterion is selected from the group consisting of electrons and alkali metal anions.

6. The method and apparatus of claim 1 in which said compound has a lattice structure comprising alkali metal cations complexed by 15-CROWN-5, and a counterion.

7. The method and apparatus of claim 6 in which said counterion is selected from the group consisting of electrons and alkali metal anions.

8. A method and apparatus of claim 1 in which said compound is an alkalide selected from the group consisting of $K^+(15\text{-CROWN-}5)_2 K^-$ and $Rb^+(15\text{-CROWN-}5)_2 Rb^-$.

9. A method and apparatus of claim 1 in which said compound is an electride selected from the group consisting of $K^+(15\text{-CROWN-}5)_2 e^-$ and $Rb^+(15\text{-CROWN-}5)_2 e^-$.

10. A method and apparatus for converting heat to electricity comprising:
    a) a vacuum diode, a cathode of said vacuum diode being in thermal contact with a mass from which said heat is to be removed, an anode of said vacuum diode being in thermal contact with a mass to which said heat is to be carried, said cathode of said vacuum diode having a work function consistent with copious electron emission at the temperature of said mass from which heat is to be removed, said cathode being separated from said anode by a vacuum, and, b) an electrical load means, which is supplied in a manner comprising the steps:

allowing electrons to flow from said cathode of said vacuum diode to the said anode of said vacuum diode, whereby heat is carried from said cathode to said anode, and an electric current, the improvement wherein being that a compound composed of complexed alkali metal cations forms part of an electrode selected from the group consisting of said anode and said cathode.

11. The method and apparatus of claim 10 in which said compound is selected from the group consisting of alkalides and electrides.

12. The method and apparatus of claim 10 in which said compound has a lattice structure comprising alkali metal cations complexed by a complexing agent selected from the group consisting of crown ethers, aza-crowns, cryptands, aza-cryptands, poly-aza bicyclic complexants and zeolites, and a counterion.

13. The method and apparatus of claim 12 in which said counterion is selected from the group consisting of electrons and alkali metal anions.

14. The method and apparatus of claim 10 in which said compound has a lattice structure comprising alkali metal cations complexed by 15-CROWN-5, and a counterion.

15. The method and apparatus of claim 14 in which said counterion is selected from the group consisting of electrons and alkali metal anions.

16. A method and apparatus of claim 10 in which said compound is an alkalide selected from the group consisting of $K^+(15\text{-CROWN-}5)_2K^-$ and $Rb^+(15\text{-CROWN-}5)_2Rb^-$.

17. A method and apparatus of claim 10 in which said compound is an electride selected from the group consisting of $K^+(15\text{-CROWN-}5)_2e^-$ and $Rb^+(15\text{-CROWN-}5)_2e^-$.

* * * * *